Oct. 20, 1964                E. W. LENZ ETAL                3,153,254
                              WINDSHIELD WIPER
Filed July 19, 1960                                    2 Sheets-Sheet 1
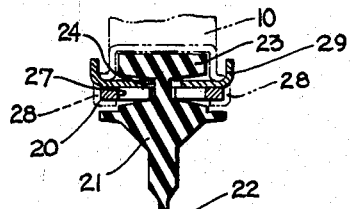
Fig. 8
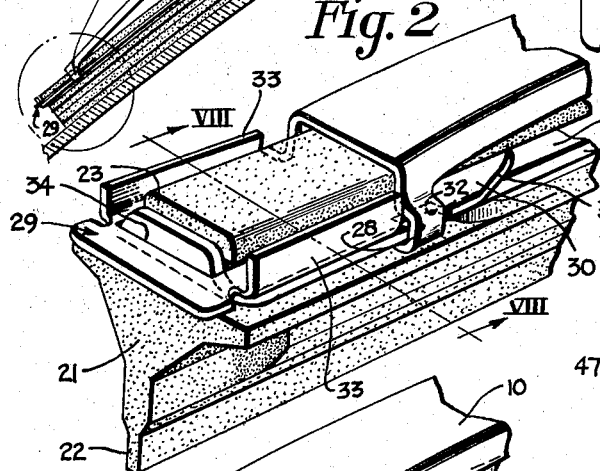
Fig. 1
Fig. 2
Fig. 3
Fig. 6
Fig. 4
Fig. 5
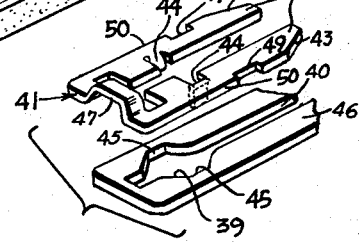
Fig. 7
Fig. 4A
INVENTOR.
EMORY W. LENZ and
BY ANTHONY C. SCINTA
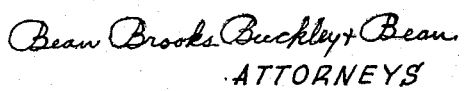
ATTORNEYS

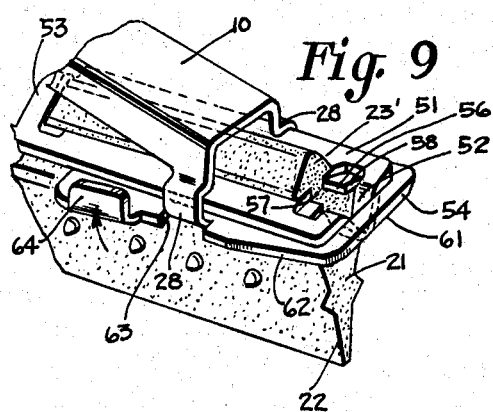
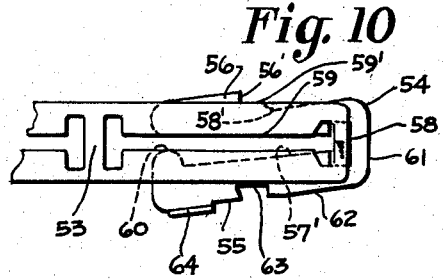
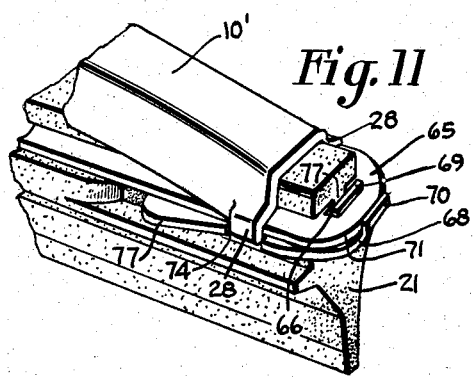
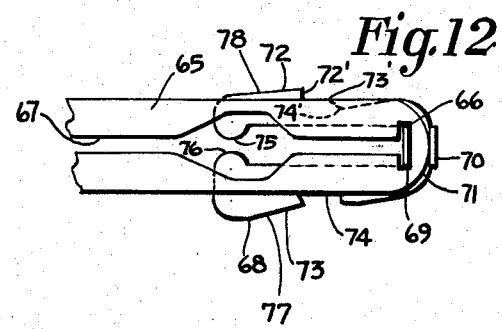
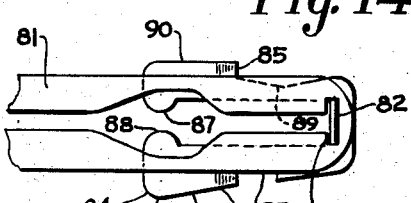
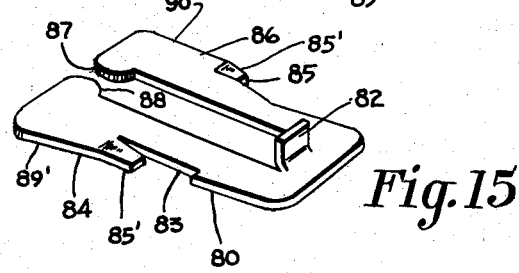
INVENTOR.
EMORY W. LENZ and
BY ANTHONY C. SCINTA.
ATTORNEYS.

United States Patent Office 3,153,254
Patented Oct. 20, 1964

3,153,254
WINDSHIELD WIPER
Emory W. Lenz, Buffalo, and Anthony C. Scinta, Hamburg, N.Y., assignors to Trico Products Corporation, Buffalo, N.Y.
Filed July 19, 1960, Ser. No. 43,943
8 Claims. (Cl. 15—250.42)

The present invention relates to an improved wiper for cleaning the windshield of an automobile and more specifically to an improved wiper of the type wherein the blade or wipin gelement portion of the wiper is selectively replaceable in the superstructure in which it is mounted.

It is an important object of the present invention to provide an improved latch structure which will permit a subassembly consisting of a backing strip and blade element to be selectively inserted and removed from an associated wiper superstructure. The particular latch of the present invention permits the manufacture of blades having a removable wiping element from slightly modified molds and dies which were previously used for making blade assemblies in which the wiping element was not removable. Thus this latch effects a production economy by permitting an entirely new product to be made from dies and other production equipment previously used for other products.

It is another object of the present invention to provide a wiper construction wherein the blade is releasably mounted in an articulated superstructure in such a manner that it can be inserted and removed therefrom without the use of tools of any type and without disasembling any parts of the superstructure. Other objects and attendant advantages of the present invention will readily be perceived hereafter.

The present invention relates to an improvement in the type of wipers such as shown in Patent No. 2,649,605 wherein the wiping element can be removed from the superstructure for purposes of replacement. In accordance with the present invention, the improved wiper includes a blade, a flexible backing strip for mounting the blade, and a separate latch, the foregoing elements being assembled as a subassembly for insertion into the superstructure of a wiper. The normal orientation between the wiper blade and the backing strip is utilized to assist in holding the latch in engagement with the other two elements, and interengaging means are provided between the backing strip and the latch to prevent relative longitudinal movement therebetween. In accordance with certain forms of the present invention, the latch contains a pair of spring biased legs, each having a notch, adapted to receive a claw of the super-structure. Because the latch is firmly engaged with the backing strip and because the notches in the latch firmly engage the claws of the superstructure, the wiping blade is thus held in position. In order to separate the subassembly, consisting of the blade, backing strip, and latch from the superstructure, it is merely necessary to apply digital pressure to portions of the latch to move the legs thereof together against the spring bias tending to move them apart, and after the claws are free of the notches in the latch, the subassembly can be pulled from the superstructure. In order to reinsert a subassembly, it is merely necessary to thread the backing strip, which mounts both the blade and the latch, into the spaced sets of claws depending from the superstructure, the latch being of such a construction that the spring bias of the legs produces a self-locking action between the notches therein and one set of claws of the superstructure after the subassembly has reached its proper operating position. A similar mode of operation is obtained from those modifications of the present invention wherein only one leg of the latch has a notch, as set forth in greater detail hereafter. The present invention will be more fully understood when the following portions of the specification are read in conjunction with the accompanying drawings wherein:

FIG. 1 is a side elevational view of a wiper incorporating the present invention;

FIG. 2 is an enlarged perspective view of the circled portion of FIG. 1;

FIG. 3 is a plan view of the latch in position on the backing strip;

FIG. 4 is an exploded perspective view of the latch showing its relationship to the backing strip;

FIG. 4A is a slightly modified form of the embodiment of FIG. 4;

FIG. 5 is a fragmentary perspective view of the end of a wiper blade using a modified type of latch;

FIG. 6 is a plan view of the latch and backing strip disclosed in FIG. 5;

FIG. 7 is an exploded view showing the relationship between the latch and the backing strip of FIG. 5;

FIG. 8 is a view taken along line VIII—VIII of FIG. 2;

FIG. 9 is a fragmentary perspective view of another modification of the present invention;

FIG. 10 is a plan view of the modification of FIG. 9 showing the relationship between the latch and the backing strip;

FIG. 11 is a fragmentary perspective view of another modification of the present invention;

FIG. 12 is a plan view of the modification of FIG. 11 showing the relationship between the backing strip and the latch when they are in assembled relationship;

FIG. 13 is a fragmentary perspective view of a further modification of the present invention;

FIG. 14 is a plan view of the modification of FIG. 13 showing the relationship between the latch and the backing strip; and FIG. 15 is a perspective view of the latch which is used in the embodiment of FIG. 13.

The wiper blade of FIG. 1 includes a lever 10 having an arm receiving clip pivotally mounted thereon by pin 12. Arm 13 is adpted to slide into clip 11 with a bayonet type of fit, as is well known in the art. Pivotally mounted on one end of lever 10 by pin 14 is a lever 15, and pivotally mounted on the inner end of lever 15 by pin 16 is a yoke 17. The outer end of lever 15 is formed into claws 18, as are both ends of yoke 17. Claws 18 slidably engage opposite spaced side portions 19 of flexible backing strip 20 to thereby permit relative sliding movement therebetween as the wiper blade or element 21 conforms to a curved windshield. The wiper blade 21 consists of a main body portion including wiping lip 22, and a retaining head or bead 23 connected by a flexible neck 24 (FIG. 8), the latter being positioned between the sides 25 of slot 26 centrally located in backing strip 19. The head 23 of blade 21 is threaded into aperture 27 (FIG. 4), and the blade is then pulled into its position on backing strip 20, as explained in detail in Patent No. 2,697,241, dated December 21, 1954. Furthermore, the lower end of lever 10 is formed into claws 28 (FIGS. 1 and 8) which are similar in construction to claws 18 described above.

In accordance with the present invention, a latch member 29 is provided for releasably holding the subassembly of the blade element 21 and backing strip 20 in the superstructure consisting of levers 10 and 15, and yoke 17, all of the foregoing parts except the latch member 29 being substantially of conventional production types normally made to be held in permanent assembled relationship. Latch 29 (FIGS. 2, 3, and 4) is spring-like and consists of a central body portion formed into legs 30, each having a tapered nose 31 and adjacent thereto notches 32 which are adapted to receive claws 28. Proximate notches 32 are upturned tabs 33 which are adapted to be squeezed together by a person's fingers during separation of the replaceable blade subassembly, as explained in greater detail hereafter. Located proximate the end of the latch which is remote from tapered noses 31 is a slot 34 which is adapted to receive the upturned projection 35 at the end of backing strip 20, slot 34 merging with elongated slot 36 located between legs 30. The connection between slot 34 and projection 35 prevents relative longitudinal movement between latch 29 and backing strip 20 when these elements are assembled.

In order to place latch 29 in position, it is merely necessary to insert the ends of legs 30 proximate tapered noses 31 between the head 23 of blade 21 and the upper surface of backing strip 20 so that slot 36 of latch 29 will receive neck 24 of blade 21. Progressive pushing of latch 29 in the direction of the longtudinal axis of backing strip 20 will result in its reaching a position shown in FIG. 3. Thereupon the resilience of the blade 21 will cause the slot 34 of latch 29 to snap over projection 35 of backing strip 20. Thus the body portion or legs 30 of latch 29 are firmly positioned between the undersurface of head 23 of blade 21 and is confined against relative longitudinal movement along the axis of backing strip 20 because of the slot and tab connection 34–35.

The foregoing subassembly or refill unit consisting of blade 21, backing strip 20, and latch member 29 is intended to be removably mounted on the superstructure consisting of levers 10, 15, and 17 in the following manner: End 37 of subassembly 20–21–29 is inserted between opposed claws 28 so that the latter engage opposite side portions 19 of backing strip 20. The subassembly is then threaded into the remainder of the superstructure, end 37 engaging first the left hand claws 18 of yoke 17 (FIG. 2), then the claws 18 on the right side, and then the claws 18 at the end of lever 15. A point will be reached, however, where tapered noses 31 of latch 29 ride into claws 18 and because of the taper on these noses, legs 31 will be forced together against the resilient resistance offered thereby. When claws 28 are positioned abreast of notches 32, legs 31, because of the resilience of latch 29, snap outwardly to thereby cause notches 32 to receive and retain claws 28 therein. When this position is reached, the backing strip 20 will be firmly engaged against separation from the superstructure by three sets of claws 18 and the set of claws 28. Claws 18, as mentioned above, slidably support backing strip 20, whereas claws 28 limit the movement of the backing strip.

If it is desired to remove the blade-backing strip-latch subassembly 21–20–29 from the superstructure, it is merely necessary to grasp upturned tabs 33 between the fingers and squeeze legs 30 together against the resilient bias provided thereby to thus move notches 32 inwardly out of engagement with claws 28. After such disengagement is effected, it is only necessary to pull the blade subassembly to the left and out of engagement with all of the claws. Thereafter a blade subassembly replacement may be made in the manner discussed above.

FIG. 4A is a slightly modified embodiment of FIG. 4. In FIG. 4A upstanding tab 33' is provided for increasing the spring pressure between legs 30' by providing a greater amount of material at the end of the latch than is shown in the embodiment of FIG. 4. Furthermore, latch 29' is adapted to be used with the type of backing strip 51 disclosed in FIGS. 9 and 10, and is adapted to engage the underside of this backing strip rather than the topside, as shown in FIG. 4. In other respects the embodiment of FIG. 4A is identical to the embodiment of FIG. 4.

An alternate embodiment of the present invention is disclosed in FIGS. 5, 6 and 7. Since the only difference between the blade shown in the above-described figures and that shown in FIGS. 5, 6, and 7 resides in the end portion where the latch is located, this is the only part which will be described. More specifically, lever 10 has claws 28, as discussed above, and rubber blade 21 has a wiping lip 22 and a head or bead 23. However, the backing strip 46 does not possess the upturned projection 35. The blade 21 is adapted to be threaded into aperture 39 which merges with slot 40 adapted to receive the neck of the blade. This threading operation is described in the above-mentioned Patent No. 2,697,241. After this threading is complete, latch 41 is adapted to be positioned on the subassembly by inserting the ends of legs 42 having tapered noses 43 between the lower side of head 23 and the upper side of the backing strip. By pushing latch 41 in the direction of the axis of the backing strip a point will be reached wherein downwardly turned tabs or projections 44 will fall into position against the walls 45 of aperture 39. It can thus be seen that the engagement 44–45 locks latch 41 against relative movement with respect to backing strip 46 and that the sandwiching of latch 41 between the wiper head and the upper side of the backing strip prevents separation of the latch from the backing strip. Furthermore, the inverted U-shaped end 47 acts as a stop against the end 48 of the wiper head 23 to thereby restrain movement of the wiper in the direction of its longitudinal axis. Notches 49 in legs 42 of the latch are adapted to receive claws 28 in a manner analogous to that described above with respect to FIGS. 2, 3, and 4.

When it is desired to separate the blade-backing strip-latch subassembly 21–46–41, it is merely necessary to apply digital pressure inwardly on the sides 50 of latch 41 to withdraw notches 49 from claws 28. As can be seen from FIG. 6, sides 50 extend beyond the sides of backing strip 46 to permit this inward movement to be effected by manual manipulation. Aside from the differences described above, the removal and reinsertion of a blade subassembly with the structure of FIGS. 5, 6, and 7 is the same as described above with respect to the structures of FIGS. 2, 3, and 4.

The embodiment of FIGS. 9 and 10 is intended to operate in a different manner than those embodiments of the invention discussed previously. More specifically, lever 10 has claws 28, as discussed above with respect to FIGS. 1–8, and rubber blade 21 has a wiping lip 22 and a head or bead 23'. However, the backing strip 51 possesses a U-shaped portion 52 forming a projection at the end thereof. After blade 21 has been threaded into the backing strip, which contains a series of ribs 53 at spaced intervals along the length thereof, latch 54 is inserted between the body portion of the blade 21 and the underside of backing strip 51. Latch 54 has legs 55 and 56 separated from each other by groove 57'. At the end of groove 57' is a slot 58 which is for the purpose of receiving U-shaped portion 52 of the backing strip. Furthermore, the inner side 59 of leg 56 is adapted to rest against neck 57 of the wiper blade. Leg 55 has a protuberance 60 at the end thereof which is also adapted to abut neck 57.

When it is desired to thread the subassembly consisting of the wiper blade, backing strip and latch member into a superstructure such as shown in FIG. 1 it is only necessary to thread the end of the subassembly which is remote from the end on which latch 54 is mounted into claws 18 at the left of yoke 17, then into claws 18 at the right of yoke 17 and then into claws 18 at the outer end of lever 15. The movement of the subassembly to the right in FIGURE 2 is continued until such time as the end mounting latch 54 lies somewhere between claws 28 and claws 18. Thereupon the movement of the subassembly is reversed and the end 61 of latch 54 and the end of the backing strip are threaded into claws 28. Continued movement of latch 54 into the space between claws 28 will cause one of these claws to ride up inclined surface 62 until such time as it seats in notch 63. It is to be noted that leg 56 has an abutment 56' thereon which limits movement of the subassembly to the right (FIG. 9) when the latch reaches its assembled position relative to claws 28. At this point the subassembly consisting of the backing strip, blade and latch will be retained against movement because of the engagement between claw 28 and notch 63.

It will of course be appreciated that as the relative movement between inclined surface 62 and claw 28 is experienced leg 55 will be moved toward leg 56 against the resilient bias offered by the inherent springiness of latch 54 and against the resilient bias provided by the neck 57 of blade 21. As noted above once the final assembled position is reached leg 55 will snap to the position shown in FIG. 9 wherein claw 28 remains in slot 63.

When it is desired to remove the subassembly 21–51–54 from the superstructure of the wiper it is only necessary to press tab 64 in the direction of the arrow in FIG. 9. This will cause slot 63 in leg 55 to move out of engagement with claw 28 against the inherent bias provided by the springiness of latch 51 and the bias provided by the neck 57 of the blade 21 acting against protuberance 60. After this disengagement is complete, as a result, in essence, of leg 55 pivoting about U-shaped portion 52 of the backing strip, the subassembly 21–51–54 is forced to the left in FIG. 9 or to the right in FIG. 1 for effecting total disengagement between claws 28 and all portions of latch 54. It will be noted that the leg 56 has a relatively wide portion 59' proximate abutment 56', portion 59' being engaged by the claw 28 across from the claw which fits into slot 63. After the initial movement of the subassembly following the disengagement between claw 28 and slot 63, the claw which was not in engagement with the slot will drop into cut-away portion 58' to thereby provide a relatively loose fit between claws 28 and latch 54 to facilitate the separation between them. After this disengagement has been completed as a result of the movement of the subassembly 21–51–51 to the left in FIG. 9, the direction of movement of the subassembly is reversed and the end of the subassembly is guided to miss claws 28 as it is removed from the other three sets of claws 18. The modification of FIGS. 9 and 10 is especially useful in certain types of wipers wherein there is some obstruction at the outer end of the supporting lever which may hinder direct removal of the subassembly from the superstructure in the manner described above with respect to FIGS. 1–8.

The embodiment of FIGS. 11 and 12 is intended to operate in the same manner described above with regard to FIGS. 9 and 10. However, this embodiment has certain structural differences which permit it to be used with backing strips and a portion of the superstructure 10' of the configuration disclosed in these figures. In this particular case, the backing strip 65 has a slot 66 at the end thereof in addition to the slot 67 which accommodates the neck of the wiper blade 21. Latch 68, which is adapted to be placed between the underside of backing strip 65 and a portion of blade 21 has upturned tabs or projections 69 and 70, the former fitting in slot 66 and the latter abutting the end 71 of the backing strip. It will thus be seen that tabs 69 and 70 prevent relative longitudinal movement between the latch 68 and the backing strip. Latch 68 has legs 72 and 73, the latter having a notch 74 therein for receiving one of the claws 28 in the same manner described above relative to FIGS. 9 and 10. Furthermore, leg 72 has an abutment 72', a portion 73' and a recess 74', which are analogous to elements 56', 59' and 58' respectively, of FIG. 10. Furthermore, legs 72 and 73 have protuberances 75 and 76, respectively, which are adapted to abut opposite sides of the neck 77 of blade 21. Thus latch 68 is held in engagement with backing strip 65 and blade 21 because of the relationships provided by upturned tabs 69 and 70 with the end of the backing strip, the relationship between protuberances 75 and 76 and the neck of blade 21, and because the latch has a portion thereof lying between the blade 21 and the backing strip 65.

Since the subassembly consisting of the blade, backing strip and latch is adapted to be inserted and removed from an associated superstructure in the same manner described above with respect to FIGS. 9 and 10 it is deemed unnecessary to repeat these steps at this point. It will be noted however, that there is no tab in the embodiment of FIGS. 11 and 12 which corresponds to the tab 64 of FIGS. 9 and 10. A tab such as 64 is absent from the embodiment of FIGS. 11 and 12 to avoid any possibility of interference between it and a portion of superstructure 10' which is of a type having a portion extremely close to this portion of the latch. In order to remove claw 28 from notch 74 (FIG. 11), it is only necessary to grasp portions 77 and 78 between the fingers, apply digital pressure, and after claw 28 is no longer in slot 74 to move the subassembly carrying the blade to the left in FIG. 11.

The embodiment of FIGS. 13, 14 and 15 is intended to operate in a manner which is generally similar to that described above with respect to FIGS. 9–12. The latch 80 is intended to lie between a portion of the wiper blade and the underside of backing strip 81. Latch 80 has an upstanding tab or projection 82 which fits within a slot 83' in backing strip 81 when they are in assembled position. This engagement prevents relative longitudinal movement between the latch and the backing strip. Latch 80 has a notch 83 in leg 84. Furthermore leg 86 has a protuberance 87 and leg 84 has a protuberance 88. These protuberances are adapted to engage opposite sides of the neck of the blade 21. Abutment 85 and recessed portion 89 are analogous in function to abutment 56' and recessed portion 58' of FIG. 10. Legs 84 and 86 have downwardly turned tabs 85' to accommodate the widened claws 28'. In other words, one side of each claw 28' rests against its associated tab 85'. The tabs 85' are used because the large radius 91 on the inside of each claw 28' does not permit a slot to be used which is of the type shown in FIGS. 9–12.

The modification of FIGS. 13 to 15 is assembled and disassembled on a wiper superstructure in the same manner as described above with respect to FIGS. 9 to 12, it being especially noted that in order to disengage claw 28' from notch 83 it is merely necessary to apply digital pressure to opposite sides 89' and 90 against the resilient bias offered by the neck of the blade element acting against protuberances 87 and 88.

In all of the embodiments of FIGS. 9 through 15, when the latches are in engagement with the claws it is the inherent resilience of the latches themselves as well as the biasing force provided by the neck of blade 21 against the leg containing the notch which prevents accidental disengagement.

It is to be especially noted that the latch in each modification of the invention is locked to the backing strip against relative longitudinal movement and is further retained on the backing strip because it is sandwiched in between it and a portion of the blade. Furthermore, it is the notches in the latches in cooperation with one pair of claws on the superstructure which retain the blade subassemblies in assembled relationship with the superstructure. The foregoing described type latching structures differ from certain conventional models of blades in that the conventional blades have backing strips which have widened portions which contain notches for the purpose of receiving claws such as 28 (FIG. 2), and thus hold the backing strip against longitudinal movement. In the prior art wipers, one or both claws 28 are formed in position in the notches when the blades are made and are therefore not separable from the notches. In accordance with the present invention, the lateral extension and its notches are eliminated and the latch member takes their place. Furthermore, as has been explained above, by the use of the present invention a blade, backing strip, and latch subassembly may be supplied as a separate commodity for replacement of like subassemblies in existing superstructures.

It can thus be seen that the above-described structures are manifestly capable of achieving the above-enumerated objects of the present invention, and while preferred embodiments have been disclosed, it is to be understood that the invention is not to be limited thereto, but may be otherwise embodied within the scope of the following claims.

What is claimed is:

1. A windshield wiper comprising a blade, a flexible backing strip for mounting said blade, a superstructure, claws on said superstructure for movably engaging spaced side portions of said backing strip, a separate latch member adapted to be mounted on said backing strip, a slot and a projection receivable therein constituting interlocking means for firmly engaging said latch member to said backing strip to thereby prevent relative sliding movement therebetween in the direction of the backing strip axis, a resilient leg on said latch member, said leg being provided with a notch forming a pair of opposing shoulders, said pair of opposing shoulders resiliently interlocking with at least one of said claws to thereby confine the longitudinal movement of said latch member and therefore confine longitudinal movement of said backing strip relative to said superstructure, said leg on said latch member being manually depressible to disengage said pair of opposing shoulders from said claw, thereby permitting assembly and disassembly of said blade, backing strip, and latch member as a unit relative to said superstructure.

2. A windshield wiper as set forth in claim 1 wherein said latch member has a body portion which is adapted to be positioned between a portion of said backing strip and a portion of said blade thereby cooperating with said interlocking means to prevent relative sliding movement to retain said latch member in position relative to said blade and backing strip when they constitute a subassembly separated from said superstructure.

3. A windshield wiper comprising, in combination with an arm-pressure distributing superstructure having blade-straddling claws, a blade of rubbery material having a wiping portion and a back portion, a surface conforming backing strip provided with a longitudinal slot into which the back portion is mounted, and a latch interlockingly coupling the backing strip to the claws, said latch having a pair of legs straddling the back portion lengthwise thereof, at least one of said legs being provided with a notch having a pair of opposing shoulders, said pair of opposing shoulders detachably interlocking with the claws and the backing strip to hold the wiper assembly operative.

4. A windshield wiper comprising, in combination with an arm pressure distributing superstructure having blade-straddling claws, a blade of rubbery material having a wiping portion and a back portion, a surface conforming backing strip provided with a longitudinal slot into which the back portion is mounted and a latch interlockingly coupling the backing strip to the claws, said latch having a pair of legs straddling the back portion lengthwise thereof, one of said legs being provided with a notch, said notching forming a pair of opposing shoulders, said pair of opposing shoulders resiliently interlocking with a claw to hold the wiper assembly operative and depressible from interlocking engagement with such claw to enable displacement of the blade from the superstructure.

5. A refill unit for windshield wiper comprising a wiping element, a backing strip for mounting said wiping element and a separate latch element, said separate latch element comprising a pair of legs resiliently connected to each other at one end thereof and each having a notch therein for receiving a claw of a wiper superstructure, each of said notches forming a pair of opposing shoulders, said pair of opposing shoulders resiliently interlocking with a claw, each leg having a tapered end remote from the area at which said legs are connected to each other to thereby permit said legs to be guided automatically into interlocking latching engagement with said claws, means on said latch element for securing said latch element against substantial relative longitudinal movement with respect to said backing strip, and upstanding tabs on each of said legs for receiving digital pressure to cause said legs to be pressed toward each other.

6. A windshield wiper comprising, in combination with an arm pressure distributing superstructure having blade-straddling claws, a blade of rubbery material having a wiping portion and a back portion, a surface conforming backing strip provided with a longitudinal slot into which the back portion is mounted and a latch interlockingly coupling the backing strip to the claws, said latch having a pair of legs straddling the back portion lengthwise thereof, at least one of said legs being provided with a notch forming a pair of opposing shoulders, said pair of opposing shoulders resiliently interlocking with a claw to hold the wiper assembly operative and depressible from interlocking engagement with such claw to enable displacement of the blade from the superstructure.

7. A refill unit for a windshield wiper comprising a wiping element, a backing strip for mounting said wiping element and a latch element on said backing strip secured against substantial relative longitudinal movement with respect to asid backing strip, said latch element comprising a pair of legs resiliently connected to each other, said legs straddling a portion of said wiping element, at least one of said legs being provided with a notch therein forming a pair of opposing shoulders for receiving a claw of a wiper superstructure in resilient latching engagement between said pair of opposing shoulders, said legs being manually depressible to permit displacement of said notch from said claw.

8. A refill unit for a windshield wiper comprising a wiping element, a backing strip for mounting said wiping element and a latch element interlockingly engaged with said backing strip and secured against substantial relative longitudinal movement with respect to said backing strip, said latch element comprising a pair of legs resiliently connected to each other at one end thereof, at least one of said legs having a notch therein forming a pair of opposing shoulders for receiving a claw of a wiper superstructure between said pair of opposing shoulders, guiding means for automatically guiding said legs into latching engagement with said claws, said legs being depressible to enable displacement of said notch from said claw.

References Cited in the file of this patent

UNITED STATES PATENTS

| | | |
|---|---|---|
| 2,741,792 | Enrlich et al. | Apr. 17, 1956 |
| 2,782,443 | Krohm | Feb. 26, 1957 |
| 2,782,446 | Krohm | Feb. 26, 1957 |
| 2,782,447 | Anderson | Feb. 26, 1957 |
| 2,782,449 | Anderson | Feb. 26, 1957 |
| 2,798,244 | Nesson | July 9, 1957 |
| 2,983,945 | De Pew | May 16, 1961 |